(12) United States Patent
Ciocari et al.

(10) Patent No.: US 11,175,860 B2
(45) Date of Patent: Nov. 16, 2021

(54) VIRTUAL MEMORIES TO LOAD OPERATING SYSTEMS

(71) Applicant: Hewlett-Packard Development Company, L.P., Spring, TX (US)

(72) Inventors: Juliano F. Ciocari, Porto Alegre (BR); Charles R. Staub, Porto Alegre (BR); Paulo Alcantara, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,908

(22) PCT Filed: Dec. 14, 2017

(86) PCT No.: PCT/US2017/066281
§ 371 (c)(1),
(2) Date: Jul. 30, 2019

(87) PCT Pub. No.: WO2019/117905
PCT Pub. Date: Jun. 20, 2019

(65) Prior Publication Data
US 2020/0301616 A1    Sep. 24, 2020

(51) Int. Cl.
*G06F 3/06* (2006.01)
*G06F 9/4401* (2018.01)

(52) U.S. Cl.
CPC .......... *G06F 3/0664* (2013.01); *G06F 3/0604* (2013.01); *G06F 3/0631* (2013.01); *G06F 3/0644* (2013.01); *G06F 3/0673* (2013.01); *G06F 9/4406* (2013.01); *G06F 9/4411* (2013.01)

(58) Field of Classification Search
CPC .... G06F 3/0664; G06F 3/0631; G06F 3/0644; G06F 9/4406; G06F 9/4411
See application file for complete search history.

(56) References Cited

U.S. PATENT DOCUMENTS

| | | | |
|---|---|---|---|
| 6,098,158 A | 8/2000 | Lay et al. | |
| 7,281,124 B2 | 10/2007 | Rothman et al. | |
| 8,082,400 B1 | 12/2011 | Chang et al. | |
| 8,495,350 B2 | 7/2013 | Chan et al. | |
| 8,521,950 B2 | 8/2013 | Love | |
| 2004/0158828 A1 | 8/2004 | Zimmer et al. | |
| 2008/0082810 A1 | 4/2008 | Cepulis et al. | |
| 2009/0259836 A1 | 10/2009 | Chan et al. | |
| 2014/0237224 A1* | 8/2014 | Maruyama | G06F 9/4406 713/2 |

OTHER PUBLICATIONS

How Booting Into a Boot Image Works, May 8, 2008.

* cited by examiner

*Primary Examiner* — Ernest Unelus
(74) *Attorney, Agent, or Firm* — Rahman LLC (57) ABSTRACT

An example electronic device includes a volatile memory to store a virtual memory device. A processor is to generate an operating system boot sequence in the virtual memory device. The processor uses a firmware interface system driver to create a device path comprising a location in the volatile memory containing the virtual memory device. The processor saves computer operating system files in the virtual memory device. The processor loads the operating system boot sequence by processing the computer operating system files from the virtual memory device.

14 Claims, 9 Drawing Sheets

VIRTUAL MEMORIES TO LOAD OPERATING SYSTEMS

BACKGROUND

Computers perform a boot sequence to load an operating system, OS. Computers containing a compact disc and/or digital video disc drive, or some other type of non-volatile memory device may be used for booting the OS.

DETAILED DESCRIPTION

The examples described herein provide techniques to run the boot sequence for a computer operating system without using non-volatile local media, such as disk drives, flash drives, or any other type of secondary storage device. The examples describe creating a virtual storage device that mimics the functionality of a physical non-volatile device. According to an example, the virtual device is created and stored in the main memory; i.e., volatile memory, or may be stored remotely and provided over a network communication channel and not on local non-volatile memory. The virtual storage device is accessed during the pre-boot or boot recovery phase of loading the operating system when a computer is turned on. In an example, an electronic device comprises a volatile memory to store a virtual memory device, and a processor to generate an operating system boot sequence in the virtual memory device, use a firmware interface system driver to create a device path comprising a location in the volatile memory containing the virtual memory device, save computer operating system files in the virtual memory device, and load the operating system boot sequence by processing the computer operating system files from the virtual memory device. Another example provides a non-transitory computer readable medium comprising instructions that when executed cause a processor of a computing device to create a virtual memory device in a volatile memory of the computing device; install instructions for loading an operating system boot sequence in the virtual memory device; create a system partition in the virtual memory device; save operating system files into the system partition; and load an operating system by running the operating system files from the virtual memory device.

In an example, the virtual device is created by the system firmware which creates a device path that maps to a Unified Extensible Firmware Interface, UEFI, namespace in the main memory of the computer and permits read and/or write operations on it as if it was a real storage device. A namespace is a set of symbols that are used in a computer system to organize objects of various kinds, so that these objects may be referred to by name. Accordingly, the device path is created to the virtual device that mimics a device path to a non-volatile storage device that may be used in operating system boot sequences. A volatile memory device, according to another example, comprises a virtual memory to mimic a computer operating system boot sequence function provided by a non-volatile memory device, the non-volatile memory comprising a device path to identify a namespace of the virtual memory. A globally unique identifier, GUID, partition table is provided in the virtual memory. A UEFI system partition is provided in the virtual memory and interfaced with the partition table. Operating system files are stored in the system partition, and computer-executable instructions to load the computer operating system boot sequence in the virtual memory based on the operating system files. When normal disk operations are performed on the virtual device, a virtual device driver is responsible for redirecting the operations to system Random Access Memory, RAM. A copy of the operating system may be created in volatile memory, and may be transmitted to a remote storage location, to provide a copy of the entire computer's state in case retrieval of a particular computer parameter is needed in the future due to computer malfunction.

In an example, a UEFI driver creates a virtual disk, which in turn, contains a physical device path, which mimics an actual device path to a non-volatile or network device. According to an example, the process may download OS image files including OS boot loader files among others from a preconfigured network location. The OS boot loader is called/processed in order to boot the OS. The OS image may be customized to execute specific tasks including, but not limited to, a full system re-image, hardware or software diagnostics, recovery of the currently installed OS, among other tasks.

Figure 1:
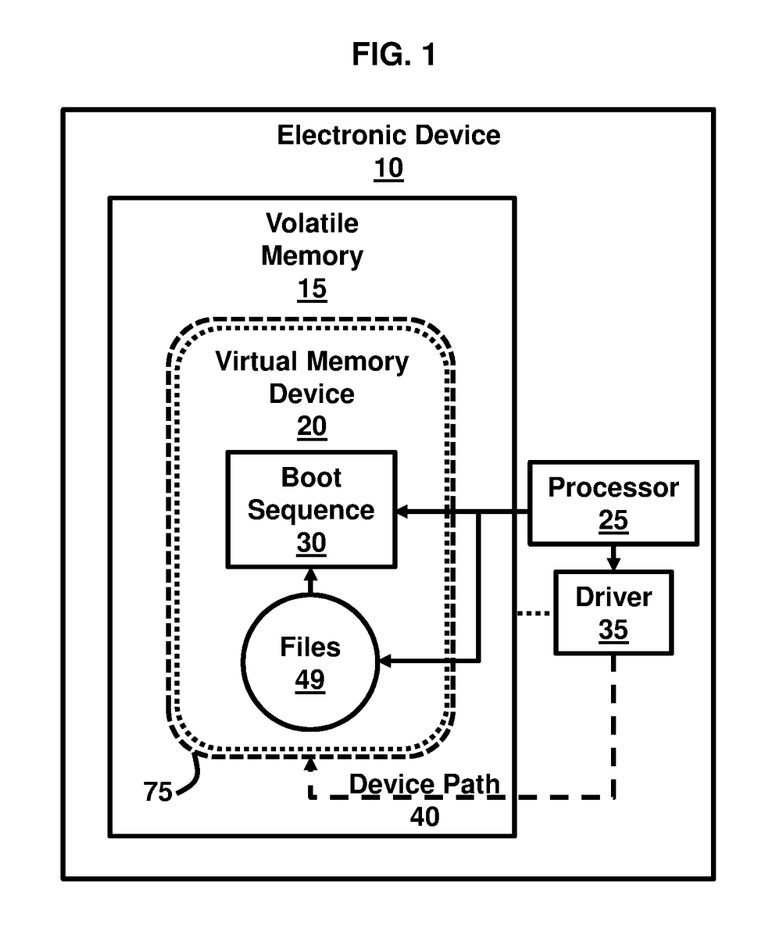
FIG. 1 is a block diagram illustrating an electronic device to utilize a virtual memory to load an operating system boot sequence, according to an example.

FIG. 1 is a block diagram illustrating an electronic device 10 comprising a volatile memory 15 to store a virtual memory device 20. In an example, the volatile memory 15 may be the primary system memory of the electronic device 10, such as RAM. Examples of the electronic device 10 may include PCs, laptop computers, tablet computers, smartphones, or any other type of computing device or electronic device that utilizes UEFI and OS for functionality of software components. A processor 25 generates an operating system boot sequence 30 in the virtual memory device 20. As further described below, the processor 25 may be any suitable processor used to implement the techniques provides by the examples described herein, and suitable for operating in a computer and/or electronic device environment. In one example, the processor 25 may be part of the electronic device 10 or, in another example, the processor 25 may be part of another system that is communicatively coupled to the electronic device 10. The processor 25 uses a firmware interface system driver 35 to create a device path 40 comprising a location 75 in the volatile memory 15 containing the virtual memory device 20, and thus the driver 35 creates the virtual memory device 20. In one example, the driver 35 comprises a software driver that is processed by the processor 25. In another example, the driver 35 comprises a hardware driver that is coupled to the volatile memory 15 and processor 25. The driver 35 may be stored in the volatile memory 15 in one example, or it may be stored in other computer-readable memory components of the electronic device 10. The processor 25 saves computer operating system files 49 in the virtual memory device 20. The processor 25 loads the operating system boot sequence 30 by processing the computer operating system files 49 from the virtual memory device 20.

For example, the techniques described herein may be utilized to boot Microsoft Windows® on a personal computer, PC, without requiring any local non-volatile media. In an example, Microsoft Windows® including Windows® PE/RE and the Windows® Cloud may be fully booted without using any local secondary storage. The OS image may then call specialized software or scripts in order to, for example, reimage the system disk with a full Windows® OS such as Windows® Pro, Windows® Enterprise, etc. or even recover a corrupted OS. The OS image may also be used for hardware diagnostics, forensic analysis, among other uses. Additionally, the examples described herein may be used as a diskless kiosk which provides custom services for end users.

Figure 2:
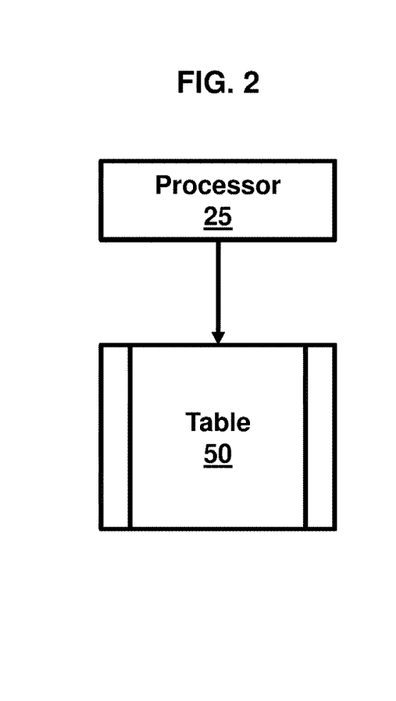
FIG. 2 is a block diagram illustrating a processor creating a partition table, according to an example.
Figure 3:
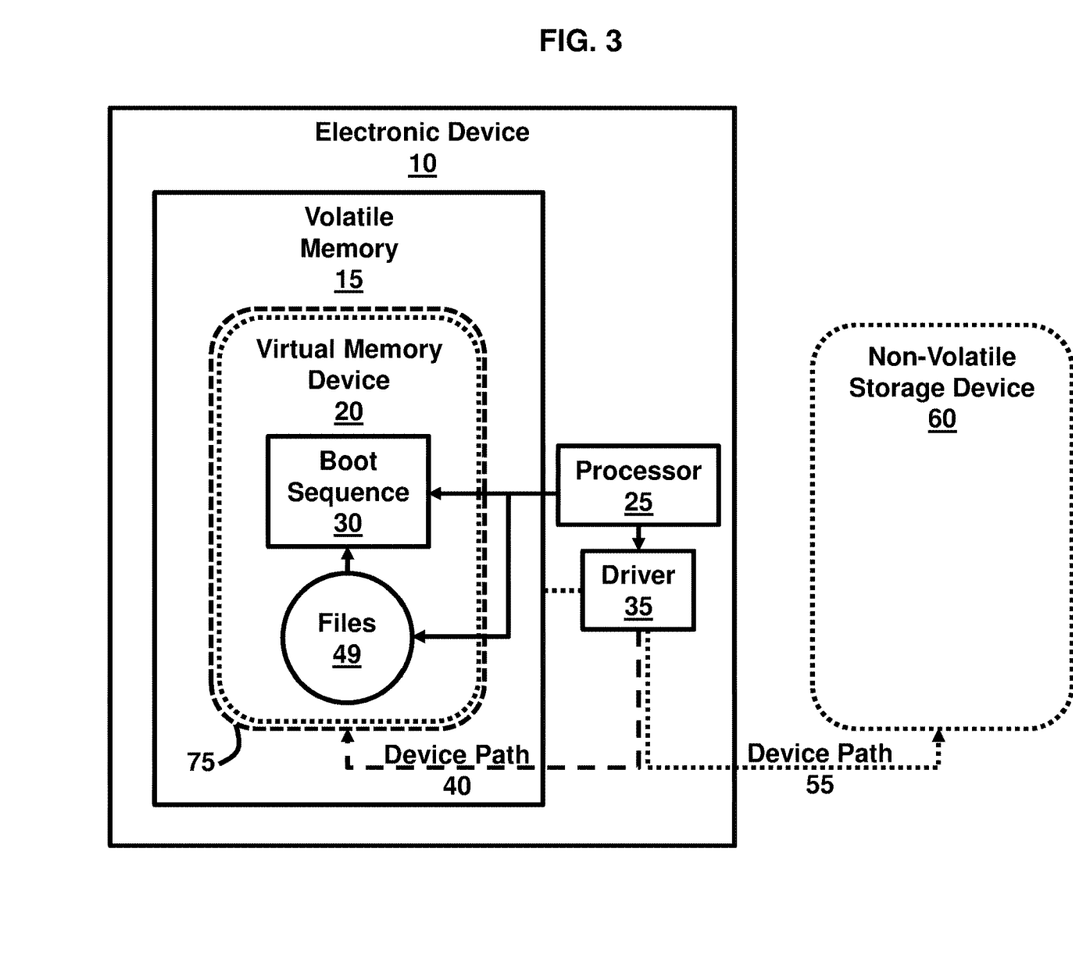
FIG. 3 is a block diagram illustrating an electronic device to utilize a virtual memory to mimic a non-volatile storage device, according to an example.
Figure 4:
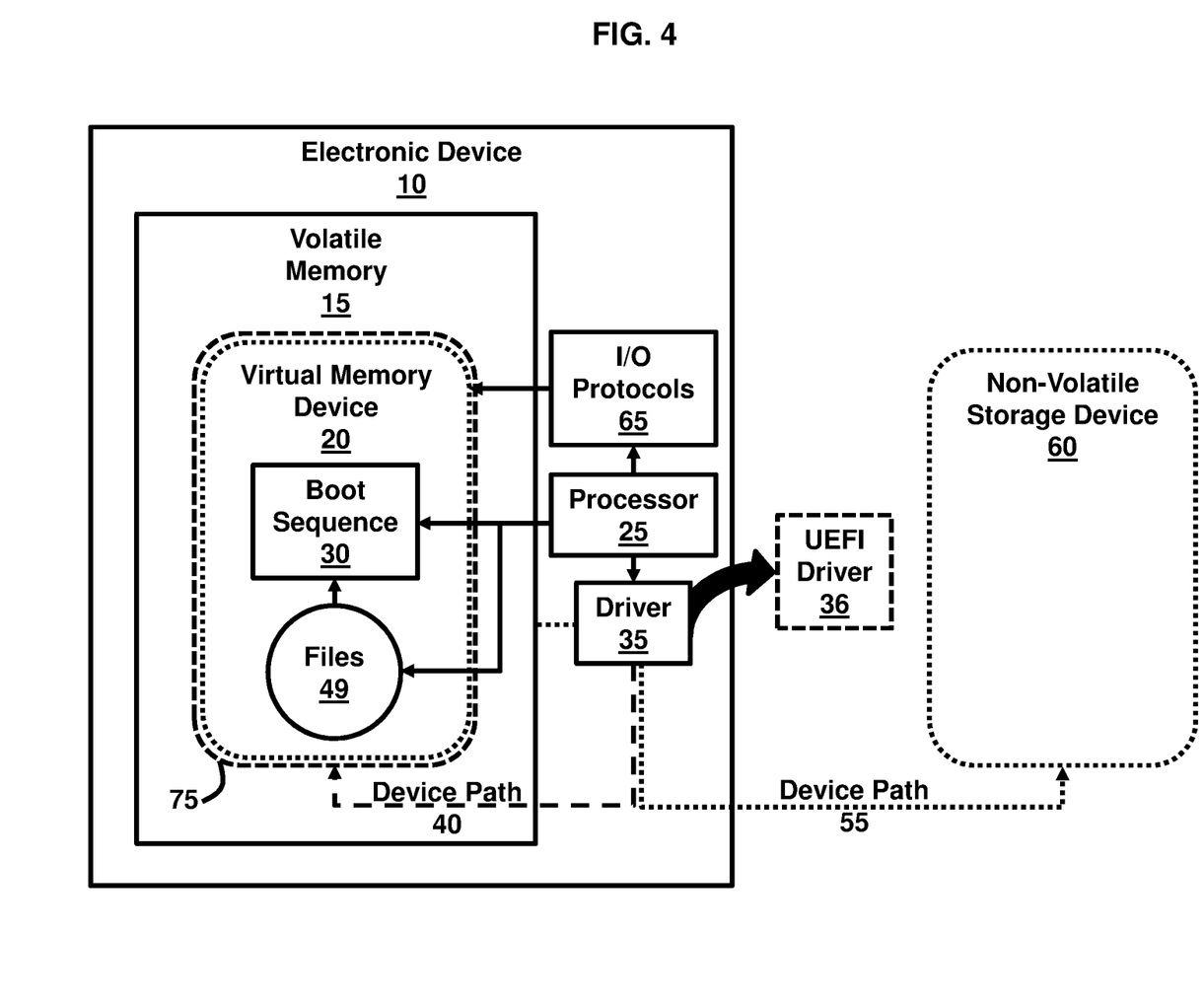
FIG. 4 is a block diagram illustrating an electronic device to utilize a Unified Extensible Firmware Interface driver to create a virtual memory, according to an example.

FIG. 2, with reference to FIG. 1, is a block diagram illustrating that the processor 25 may create a globally unique identifier partition table 50 in the virtual memory device 20. FIG. 3, with reference to FIGS. 1 and 2, is a block diagram illustrating that the processor 25 may create the device path 40 to the virtual memory device 20, during the OS pre-boot phase, that mimics the physical device path 55 to a non-volatile storage device 60. This allows the electronic device 10 to boot an OS directly from the volatile memory 15. As shown in the block diagram of FIG. 4, with reference to FIGS. 1 through 3, the processor 25 may install block input/output, I/O, and disk input/output, I/O, protocols 65 in the virtual memory device 20. Furthermore, the interface system driver 35 may comprise a unified extensible firmware interface system driver 36, according to an example.

Figure 5:
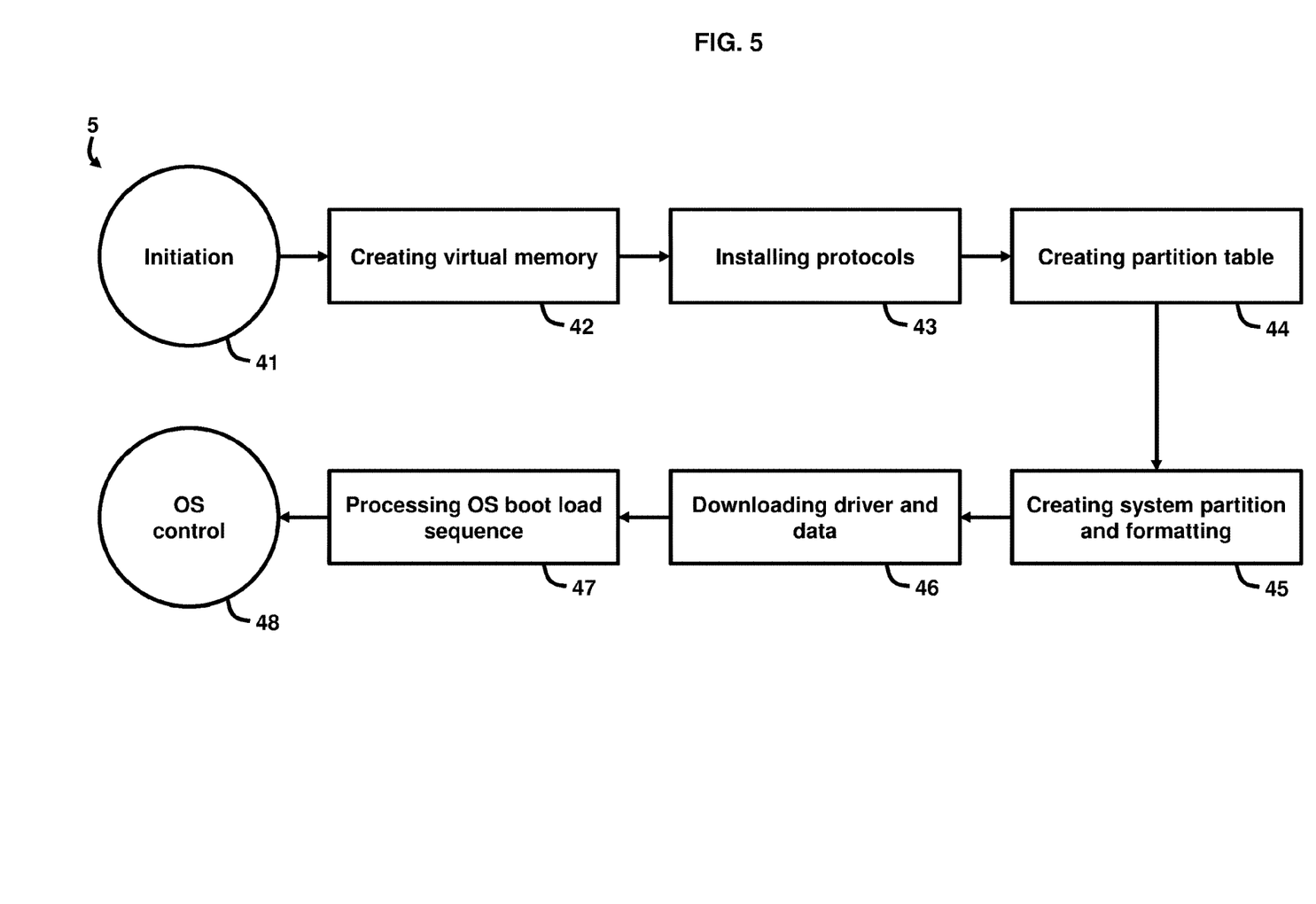
FIG. 5 is a flow diagram illustrating a method of creating a virtual memory in an electronic device, according to an example.

FIG. 5, with reference to FIGS. 1 through 4, is a flow diagram illustrating a method 5 of creating a virtual memory 20 in an electronic device 10, according to an example. The method 5 may be provided from the perspective of the execution flow of the driver 35 in order to set up the electronic device 10 to run software and to perform the boot sequence 30 of the OS directly from the volatile memory 15. According to examples, the driver 35 may execute software code to perform its functions such that the software code may be generated by the volatile memory 15, another component in the electronic device 10, or may be downloaded or accessed from another device or system that may be remotely located from the electronic device 10. The method 5 provided in the flow diagram of FIG. 5 shows a sequential example, and other intermediary processes may be incorporated into the method 5 without departing from the general technique provided by the method 5. Additionally, the various processes described in the method 5 may be implemented in a different sequence than as presented in the flow diagram of FIG. 5, according to other examples.

In block 41, a driver 35, which may be a UEFI driver 36, is initiated by pressing a single key or button, not shown, on the electronic device 10, for example, or automatically when no bootable device is provided. In block 42, a virtual memory device 20 is created by the driver 35 into the main system memory; e.g., the volatile memory 15, of the electronic device 10. The virtual memory device 20 is created by the driver 35 by establishing a location 75 in the volatile memory 15 where a device path 40 is created for accessing the virtual memory 15. The device path 40 is set to mimic an actual physical device path 55 that may be linked to a non-volatile storage device 60. Accordingly, the electronic device 10 assumes that the device path 40 is similar to the device path 55 for the purposes of performing an OS boot sequence 30.

In block 43, protocols 65 that are needed by an OS boot loader are installed on the virtual memory device 20 by the driver 35. The protocols 65 may comprise UEFI protocols, and the device path 40 that mimics the real physical device path 55 is installed in the volatile memory 15 to establish the location 75 of the virtual memory device 20. Furthermore, the protocols 65 may comprise block I/O and disk I/O protocols, which are also installed on the virtual memory device 20. The block I/O and disk I/O protocols may be used by the OS boot loader in order to read the content of the electronic device 10.

Figure 6A:
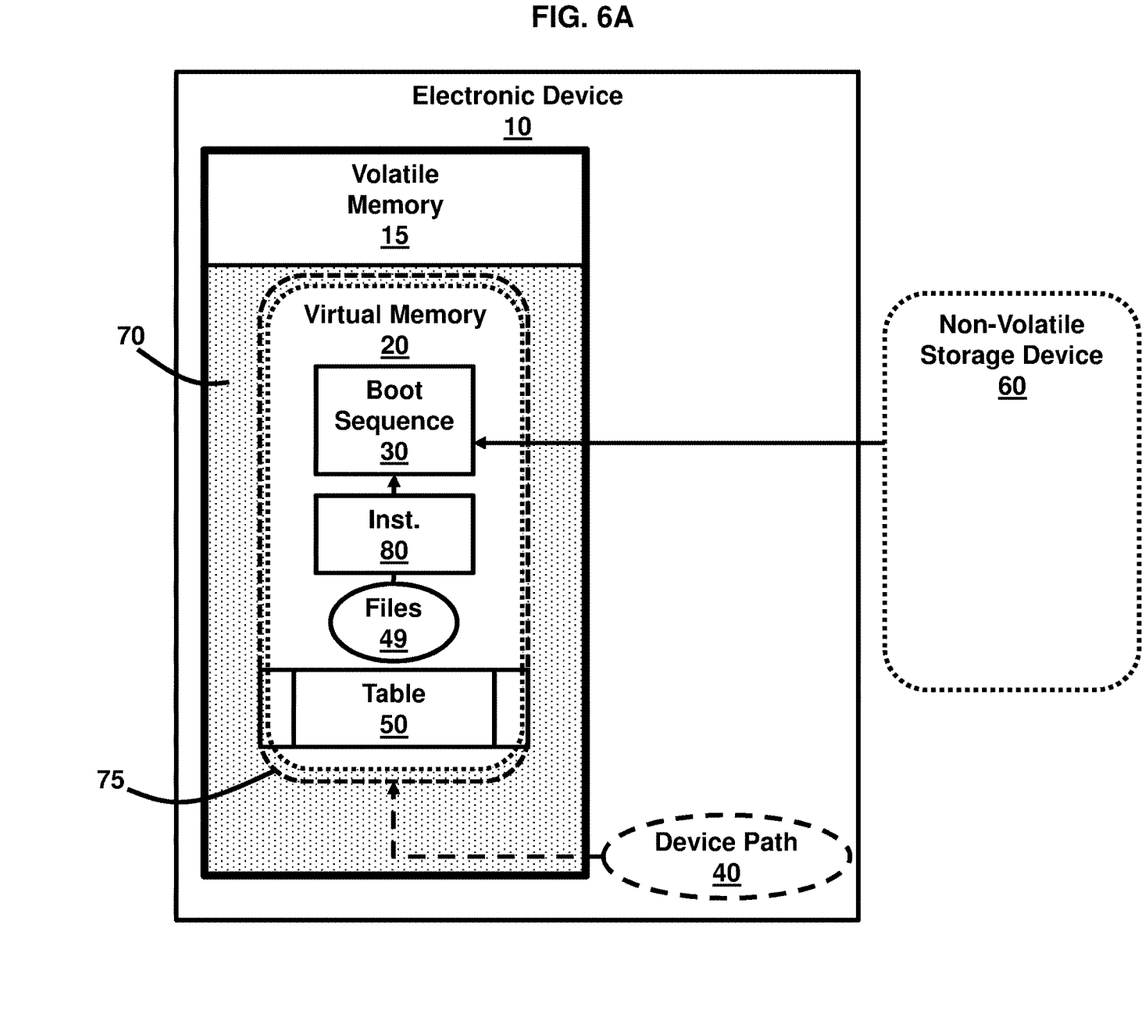
FIG. 6A is a block diagram illustrating an electronic device to utilize a virtual memory to mimic the functionality of a non-volatile storage device, according to an example.

In block 44, a partition table 50, as further shown in FIG. 6, is created by the driver 35. In an example, the partition table 50 comprises a GUID partition table. In block 45, a system partition 75 is created in the volatile memory 15 by the driver 35. In an example, the system partition 75 comprises a UEFI system partition. The system partition 75 may be formatted to the file allocation table 32, FAT32, file system, according to an example. In block 46, the OS files 49 are saved by the driver 35 into the partition 75 that is created in block 45. Next, in block 47, the system boot loader is called by the driver 35, and the OS begins its own loading process. In step 48, the OS has control over the electronic device 10.

Figure 6B:
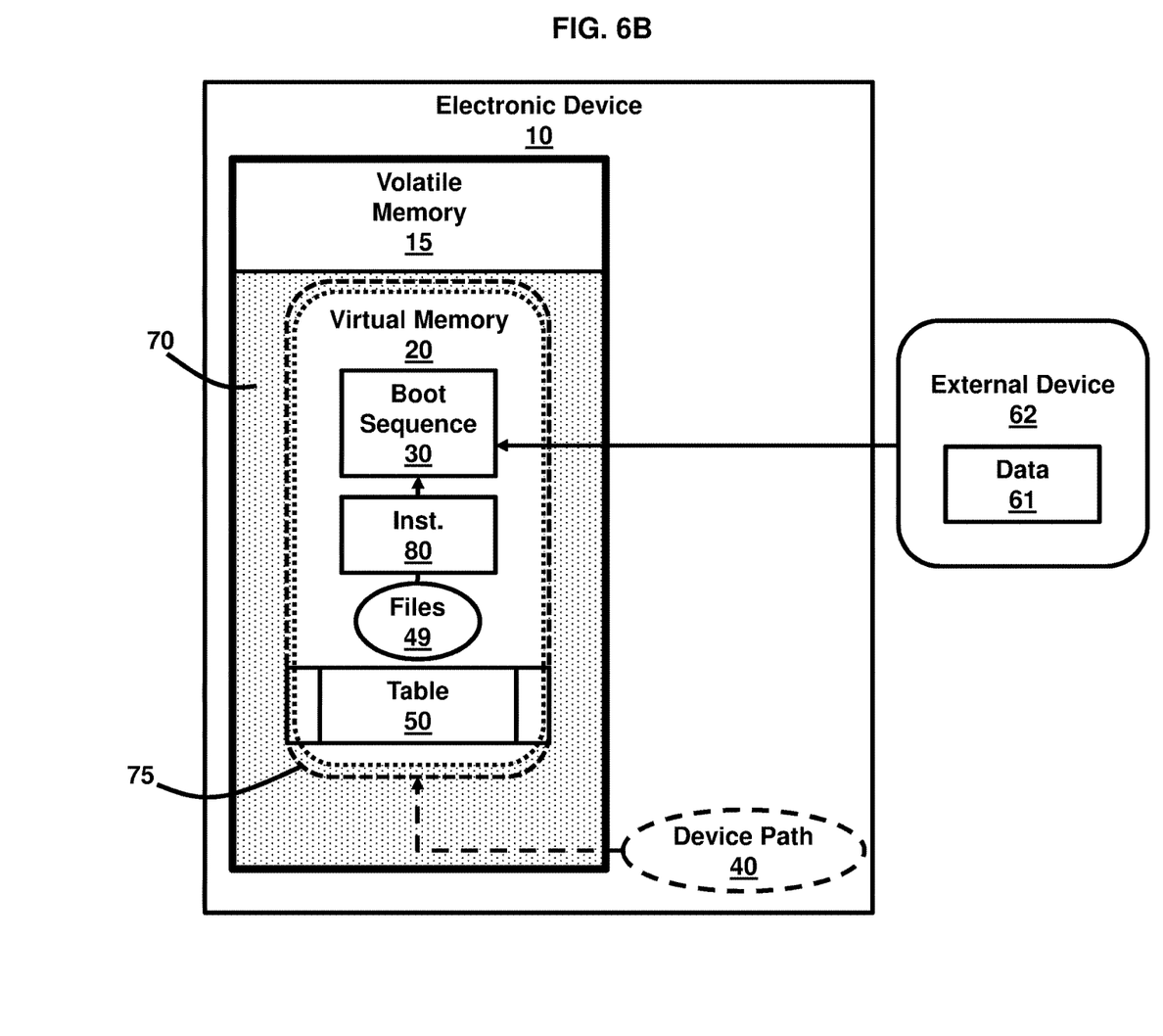
FIG. 6B is a block diagram illustrating an electronic device linked to an external device such as a network server or cloud service, according to an example.

FIG. 6A, with reference to FIGS. 1 through 5, is a block diagram illustrating an electronic device 10 comprising a volatile memory 15. A virtual memory 20 is stored in the volatile memory 15 to mimic a computer operating system boot sequence 30 provided by a non-volatile memory device 60. A GUID partition table, GPT, 50 is in the virtual memory 20. A system partition 70 is in the virtual memory 20 and interfaced with the partition table 50. The system partition 70 comprises a device path 40 to a location 75 in the volatile memory 15 containing the virtual memory 20. Operating system files 49 are stored by the firmware interface in a system partition 70. Computer-executable instructions 80 load the computer operating system boot sequence 30 in the virtual memory 20 based on the operating system files 49. Furthermore, there is no dependency on any previous installed OS in the volatile memory 15 or in any other supported memory device, for example, in the non-volatile memory device 60. The virtual memory 20 may be used to install a new OS copy or override a corrupted one previously used by the electronic device 10. In an example, the virtual memory 20 may be implemented completely by the system basic input/output system, BIOS, and may be used even without any local hard disk in the electronic device 10. The OS image may be refreshed at each system boot sequence 30. Moreover, as shown in FIG. 6B, with reference to FIGS.

1 through 6A, data 61 may be persisted in external devices 62 such as remote servers, cloud storage services, etc., in case it is needed.

Figure 7:
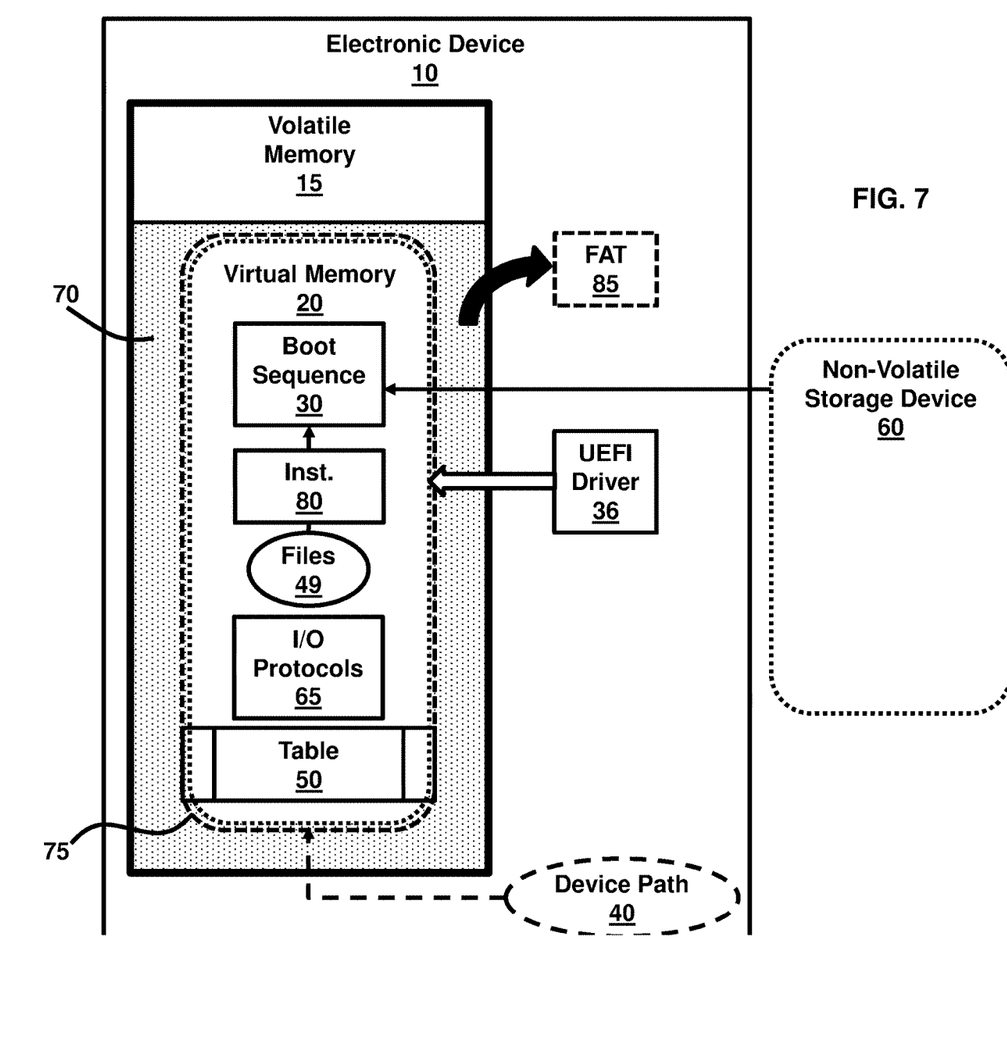
FIG. 7 is a block diagram illustrating a virtual memory stored in a system partition in an electronic device, according to an example.

FIG. 7, with reference to FIGS. 1 through 6, is a block diagram illustrating that the electronic device 10 may comprise block input/output and disk input/output protocols 65 in the virtual memory 20. The system partition 70 may be formatted to a file allocation table system format 85 in the virtual memory 20, according to an example. Additionally, the electronic device 10 may comprise a unified extensible firmware interface system driver 36 to create the virtual memory 20.

Various examples described herein may include both hardware and software elements. The examples that are implemented in software may include firmware, resident software, microcode, etc. Other examples may include a computer program product configured to include a pre-configured set of instructions, which when performed, may result in actions as stated in conjunction with the methods described above. In an example, the preconfigured set of instructions may be stored on a tangible non-transitory computer readable medium or a program storage device containing software code. In the software embodiments, instructions may be provided to the electronic device 10, which may be a computing device in an example, by a processor 25 linked to the electronic or computing device 10.

Figure 8:
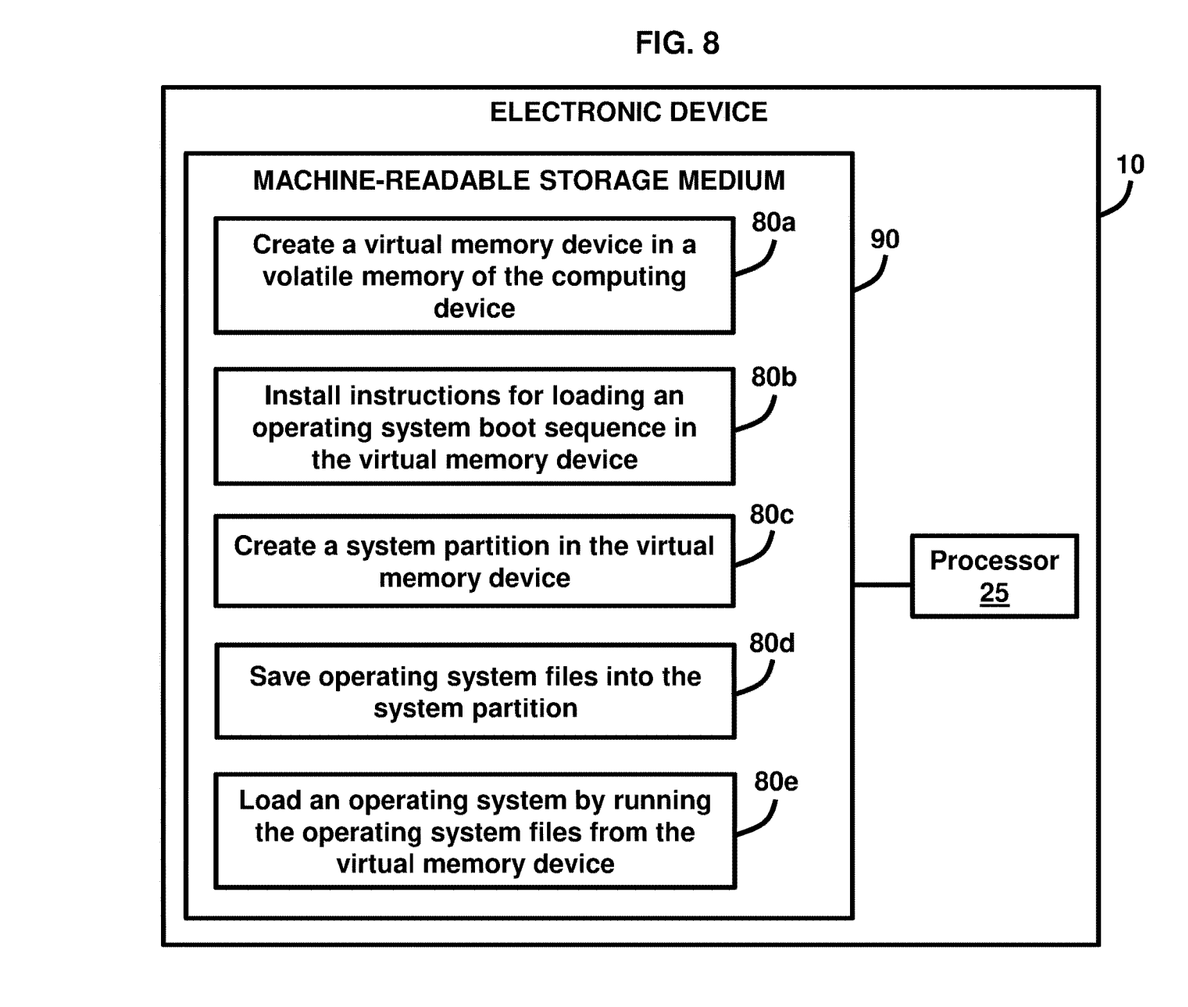
FIG. 8 is a block diagram of an electronic device for utilizing a virtual memory to load an operating system by running operating system files from the virtual memory, according to an example.

FIG. 8 with reference to FIGS. 1 through 7, is a block diagram of an electronic or computing device 10 comprising the processor 25 as described above and a machine-readable storage medium 90. Processor 25 may include a central processing unit, microprocessors, and/or other hardware devices suitable for retrieval and execution of instructions stored in a machine-readable storage medium 90. Processor 25 may fetch, decode, and execute computer-executable instructions 80a, 80b, 80c, 80d, and 80e to enable execution of locally-hosted or remotely-hosted applications for controlling action of the electronic or computing device 10. The remotely-hosted applications may be accessible on a remotely-located device, for example. As an alternative or in addition to retrieving and executing instructions, processor 25 may include an electronic circuit including a number of electronic components for performing the functionality of instructions 80a, 80b, 80c, 80d, or 80e.

The machine-readable storage medium 90 may be any electronic, magnetic, optical, or other physical storage device that stores executable instructions. Thus, the machine-readable storage medium 90 may be, for example, Read-Only Memory, ROM, an Electrically-Erasable Programmable Read-Only Memory, EEPROM, a storage drive, an optical disc, and the like. In one example, the machine-readable storage medium 90 may include a non-transitory computer-readable storage medium. The machine-readable storage medium 90 may be encoded with executable instructions for enabling execution of remotely-hosted applications accessed on the remotely-located device.

In an example, the processor 25 executes computer readable instructions 80. For example, computer-executable creating instructions 80a, executed by the driver 35, may create a virtual memory device 20 in a volatile memory 15 of the computing device 10. Computer-executable installing instructions 80b, executed by the driver 35, may install instructions for loading an operating system boot sequence 30 in the virtual memory device 20. Computer-executable creating instructions 80c, executed by the driver 35, may create a system partition 70 in the virtual memory device 20. Computer-executable saving instructions 80d, executed by the volatile memory 15, may save operating system files 49 into the system partition 70. Computer-executable loading instructions 80e, executed by the processor 25, may load an operating system by running the operating system files 49 from the virtual memory device 20.

The techniques provided by the examples described above solve the problem on needing a local non-volatile storage media such as a hard drive, compact disk, CD, drive and/or digital video disk, DVD, drive, USB flash drive, etc. in order to boot an OS, such as a Windows® OS, on an electronic device 10 such as a computer system. A virtual memory 20, which mimics a real non-volatile physical device 60, is created in the main volatile memory 15 of the electronic device 10 during the pre-boot; e.g., UEFI, etc. phase, and then, the OS image may be acquired over a communication network. The OS boot loader is called/processed to boot the OS.

Figure 9:
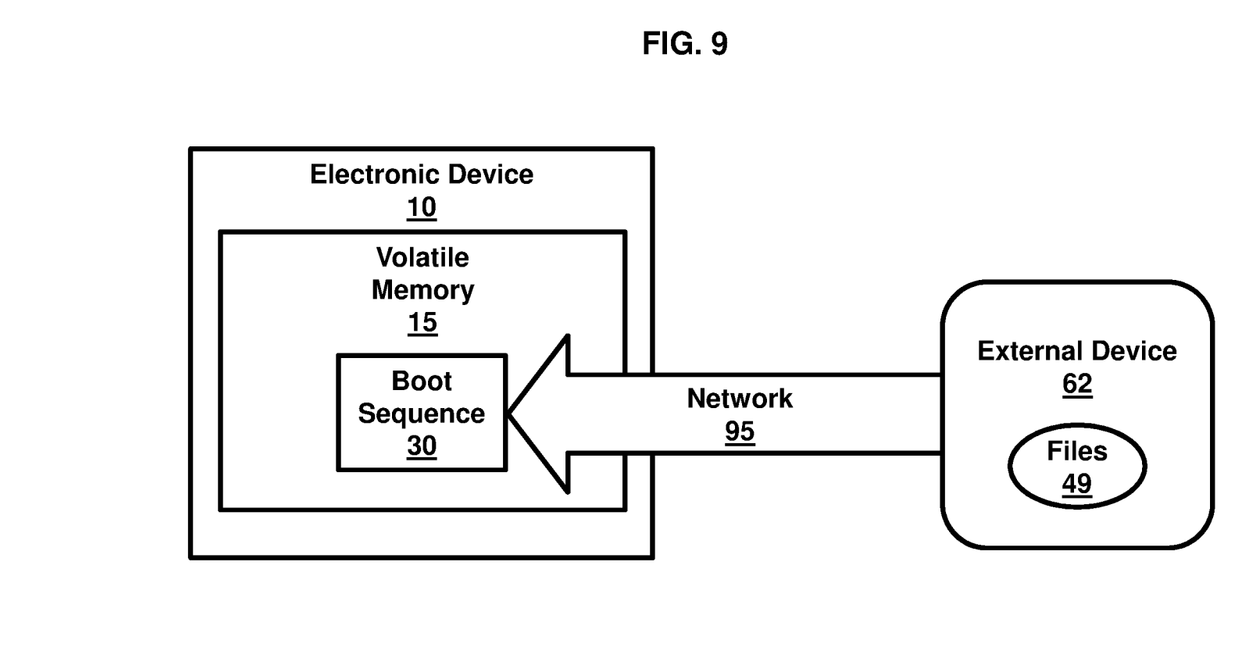
FIG. 9 is a block diagram of an electronic device receiving instructions through a communication network linked to an external device such as a network server or cloud service, according to an example.

In an example, the only dependency outside the electronic device 10, which may be utilized, is a network connection during the pre-boot phase. FIG. 9, with reference to FIGS. 1 through 8, illustrates an electronic device 10 receiving instructions through a communication network 95 and linked to an external device 62 such as a network server or cloud service. The external device 62 may transmit all necessary files 49 to set up and run the boot sequence 30 in the volatile memory 15 of the electronic device 10 and to provide a new or fresh OS installation including device drivers and properly configured applications for the electronic device 10.

According to some examples, the techniques described above may reduce costs by eliminating the need to ship physical OS and driver medias such as OS and driver DVDs, for example, with computer systems. Moreover, the process to reimage an OS may rely on the techniques described above to download and deploy all necessary OS files directly over a communication network. In some instances, users may call the support unit of computer manufacturers in order to receive a USB device or CDs/DVDs to reimage the user's computer systems. Accordingly, using the techniques described above, it is not necessary to ship CDs/DVDs to users with OS and drivers for computer systems that do not have CD and/or DVD drives.

The techniques described above also allow a streamlined process such that when a computer system is reimaged, the most up-to-date OS and driver bits are downloaded from the computer manufacturer and/or distributor networked servers. As such, the process provided by the examples described herein above does not rely on any older data available on local recovery partitions, which typically contains the data from the date the system was shipped from the factory.

Furthermore, users may lose their recovery media, overwrite the local recovery partition or even replace the system disk. With the solution provided by the examples described above, the system reimage is easily accessed or may even be accessed using an automatic/scheduled pre-set procedure. Additionally, the examples described above may also facilitate kiosk use applications. Every time a computer system boots, it can retrieve the OS image along with the pre-installed applications from a central server. This may reduce costs on maintenance and updating the systems that, typically, are scattered in various places.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. An electronic device comprising:
a volatile memory to store a virtual memory device; and
a processor to:
generate an operating system boot sequence in the virtual memory device;
create a system partition to interface with a globally unique identifiers partition table in the virtual memory;
use a firmware interface system driver to create a device path comprising a location in the volatile memory containing the virtual memory device, wherein the firmware interface system driver comprises a Unified Extensible Firmware Interface (UEFI) system driver formatted for the globally unique identifiers partition table;
save computer operating system files in the virtual memory device;
access the virtual memory device during a pre-boot or boot recovery phase of loading the operating system boot sequence by processing the computer operating system files from the virtual memory device; and
load the operating system boot sequence by processing the computer operating system files from the virtual memory device without dependency on any previously installed operating systems in the volatile memory.

2. The electronic device of claim 1, wherein the processor is to create the device path to the virtual memory device that mimics the device path to a non-volatile storage device.

3. The electronic device of claim 1, wherein the processor is to install block input/output and disk input/output protocols in the virtual memory device.

4. The electronic device of claim 1, wherein the UEFI system driver is to install UEFI protocols on the virtual memory device, and wherein the UEFI protocols are used by an operating system boot loader to load the operating system boot sequence.

5. The electronic device of claim 1, wherein the UEFI system driver is to create the virtual memory during a pre-boot phase of the operating system boot sequence.

6. A volatile memory device comprising:
a virtual memory to mimic a computer operating system boot sequence provided by a non-volatile memory device, the non-volatile memory comprising a device path to identify a namespace of the virtual memory;
a unified extensible firmware interface (UEFI) system driver to create the virtual memory;
a globally unique identifiers partition table in the virtual memory;
a unified extensible firmware interface system partition in the virtual memory and interfaced with the partition table;
operating system files stored in the system partition, wherein the system partition is formatted to a file allocation table system format in the virtual memory; and
computer-executable instructions to (i) access the virtual memory during a pre-boot or boot recovery phase of loading the computer operating system boot sequence in the virtual memory based on the operating system files, and (ii) load the computer operating system boot sequence in the virtual memory based on the operating system files without dependency on any previously installed operating systems in the volatile memory.

7. The volatile memory device of claim 6, comprising block input/output and disk input/output protocols in the virtual memory.

8. The volatile memory device of claim 6, wherein the UEFI system driver is to install UEFI protocols on the virtual memory, and wherein the UEFI protocols are used by an operating system boot loader to load the operating system boot sequence.

9. The volatile memory device of claim 6, wherein the UEFI system driver is to create the virtual memory during a pre-boot phase of the operating system boot sequence.

10. A non-transitory computer readable medium comprising instructions that when executed cause a processor of a computing device to:
create a virtual memory device in a volatile memory of the computing device using a unified extensible firmware interface (UEFI) system driver;
install instructions for loading an operating system boot sequence in the virtual memory device;
create a globally unique identifier partition table in the virtual memory device;
create a system partition in the virtual memory device;
format the system partition to a file allocation table system format;
save operating system files into the system partition;
access the virtual memory during a pre-boot or boot recovery phase of loading an operating system by running the operating system files from the virtual memory device; and
load the operating system by running the operating system files from the virtual memory device without dependency on any previously installed operating systems in the volatile memory.

11. The non-transitory computer readable medium of claim 10, wherein the processor is to create a device path to the virtual memory device that mimics a device path to a non-volatile storage device.

12. The non-transitory computer readable medium of claim 10, wherein the processor is to install block input/output and disk input/output protocols in the virtual memory device.

13. The non-transitory computer readable medium of claim 10, wherein the processor is to create the virtual memory device using a unified extensible firmware interface system driver.

14. The non-transitory computer readable medium of claim 10, wherein the processor is to instruct the UEFI system driver is to install UEFI protocols on the virtual memory device, and wherein the UEFI protocols are used by an operating system boot loader to load the operating system.

* * * * *